R. A. CARSON & W. T. PETER.
CATTLE PRICKER.
No. 74,795.    Patented Feb. 25, 1868.
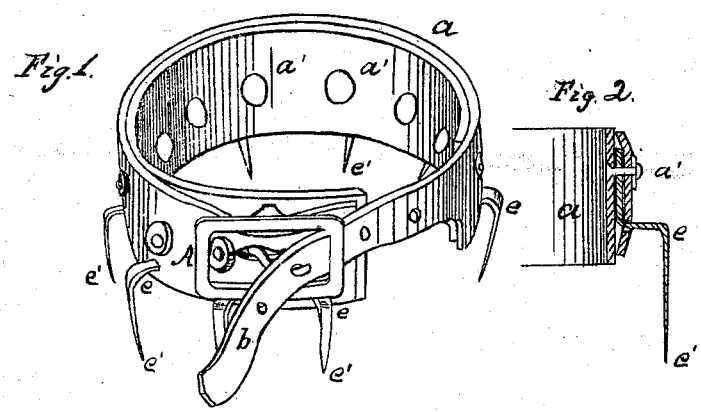

United States Patent Office.

R. A. CARSON AND W. T. PETER, OF BRIENSBURG, KENTUCKY.

Letters Patent No. 74,795, dated February 25, 1868.

IMPROVEMENT IN CATTLE-PRICKER.

*The Schedule referred to in these Letters Patent and making part of the same.*

TO ALL WHOM IT MAY CONCERN:

Be it known that we, R. A. CARSON and W. T. PETER, of Briensburg, in the county of Marshall, and State of Kentucky, have invented a new and improved Cattle-Pricker; and we do hereby declare that the following is a full, clear, and exact description thereof, which will enable those skilled in the art to make and use the same, reference being had to the accompanying drawings forming part of this specification.

This invention relates to a new and improved method of constructing apparatus whereby cattle are prevented from lying down away from home at night, and whereby, also, they are prevented from jumping fences, and are made more manageable when they are driven by drovers. It consists of a leather strap fastened around the fore leg of the animal above the knee, said strap having sharp pieces of metal secured to the same, and bent downwards, so as to prick the animal when it attempts to lie down or jump. In the accompanying plate of drawings—

Figure 1 is a perspective view of our invention.

Figure 2 is a detail sectional view of the same.

Similar letters of reference indicate corresponding parts.

$a$ is the strap or belt; $b$ is one end of the same, by means of which it is attached to the buckle A; A is the buckle; $e$ are pricking-points attached to the strap $a$ by the rivets $a'$; $a'$ are the rivets.

The strap $a$ is made of leather, or any suitable material, of any convenient width, and of sufficient length to go around the fore leg of an ox or cow, or other animal, and is made of two strips of leather riveted and sewed together, as shown in the drawings, one end of one of said strips terminating in a tongue or part, $b$, through which are punched any convenient number of holes to receive the tongue of the buckle A. The other end of the same is secured in the ordinary way to the buckle A, between the two strips of which the strap $a$ is composed; and firmly riveted to the same by the rivets $a'$, are strips of steel $e$, sharpened at the point, and bent outwards and downwards, as shown in the drawing. Said strips of steel are of any convenient number, and are sharpened into the pricking-points $e'$, as above described. Said strips of steel $e$ are provided with a hole at the upper end of the same, to receive the rivets $a'$, and by means of which said rivets, said strips $e$ are securely fastened to said strap $a$, as above described, and as shown in the drawing.

The operation is such that by buckling the strap $a$ around the leg of the animal just above the knee, so as the points $e'$ of the strip $e$ will extend downwards, so that when the animal bends the knee sufficiently to lie down or jump, the points $e'$ of the strips $e$, sticking into the flesh below the knee, will produce pain, which will make the animal desist, only sufficient motion of the leg being allowed so that the animal may walk unhurt.

Constructed as above described, it constitutes a cheap and convenient apparatus by means of which cattle are prevented from lying down or jumping.

We claim as new, and desire to secure by Letters Patent—

1. An apparatus for preventing cattle from lying down or jumping, substantially as shown and described.

2. The strap $a$, in combination with the pricking-points $e'$, substantially as shown and described, and for the purposes set forth.

R. A. CARSON,
W. T. PETER.

Witnesses:
J. W. WHITNEL,
W. T. BEARDEN.